(12) United States Patent
Jose et al.

(10) Patent No.: US 11,693,739 B2
(45) Date of Patent: Jul. 4, 2023

(54) HANG DETECTION AND REMEDIATION IN A MULTI-THREADED APPLICATION PROCESS

(71) Applicant: International Business Machines Corporation, Armonk, NY (US)

(72) Inventors: James Jose, Bengaluru (IN); Amar Shah, Pune (IN); Nilima Srivastava, Bengaluru (IN); Ajay Ponnappan, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 17/301,624

(22) Filed: Apr. 9, 2021

(65) Prior Publication Data

US 2022/0327024 A1 Oct. 13, 2022

(51) Int. Cl.
| | |
|---|---|
| *G06F 11/00* | (2006.01) |
| *G06F 11/14* | (2006.01) |
| *G06F 11/34* | (2006.01) |
| *G06F 11/30* | (2006.01) |
| *G06F 9/54* | (2006.01) |

(52) U.S. Cl.
CPC .......... *G06F 11/1415* (2013.01); *G06F 9/541* (2013.01); *G06F 11/3024* (2013.01); *G06F 11/3419* (2013.01)

(58) Field of Classification Search
CPC ............. G06F 11/1415; G06F 11/3024; G06F 11/3419
See application file for complete search history.

(56) References Cited

U.S. PATENT DOCUMENTS

| | | | |
|---|---|---|---|
| 6,681,344 B1* | 1/2004 | Andrew | G06F 11/0709 714/38.14 |
| 7,243,267 B2* | 7/2007 | Klemm | G06F 9/3861 714/39 |
| 7,502,968 B2 | 3/2009 | Betancourt et al. | |
| 7,774,783 B2 | 8/2010 | Toader | |
| 8,195,987 B2 | 6/2012 | Zeigler et al. | |
| 8,286,139 B2* | 10/2012 | Jones | G06F 11/3419 717/130 |
| 8,453,013 B1 | 5/2013 | Chen | |
| 10,725,848 B2 | 7/2020 | Kurts et al. | |
| 10,740,185 B2 | 8/2020 | Zarakowski et al. | |
| 2007/0038896 A1* | 2/2007 | Champlin | G06F 11/366 714/38.1 |
| 2007/0220513 A1 | 9/2007 | Hwang | |

(Continued)

*Primary Examiner* — Amine Riad
(74) *Attorney, Agent, or Firm* — Yee & Associates, P.C.

(57) ABSTRACT

Detecting non-callable external component APIs is provided. It is determined whether a first function call stack of a worker thread in a multi-threaded application of the computer matches a second function call stack of the worker thread. In response to determining that the first function call stack matches the second function call stack of the worker thread, an external component application programming interface (API) corresponding to the worker thread is identified from a function call stack of the worker thread. The external component API corresponding to the worker thread is marked as non-callable in an API state map. The worker thread is marked as being in a hang state. The worker thread in the hang state is terminated as a remediation action step to maintain performance.

14 Claims, 11 Drawing Sheets

(56) References Cited

U.S. PATENT DOCUMENTS

2019/0171569 A1    6/2019  Battle et al.
2019/0286545 A1*   9/2019  Gadi ..................... G06F 11/079
2020/0366759 A1*  11/2020  Sinha .................... H04L 41/40
2022/0027257 A1*   1/2022  Harutyunyan ...... G06F 11/0709

* cited by examiner

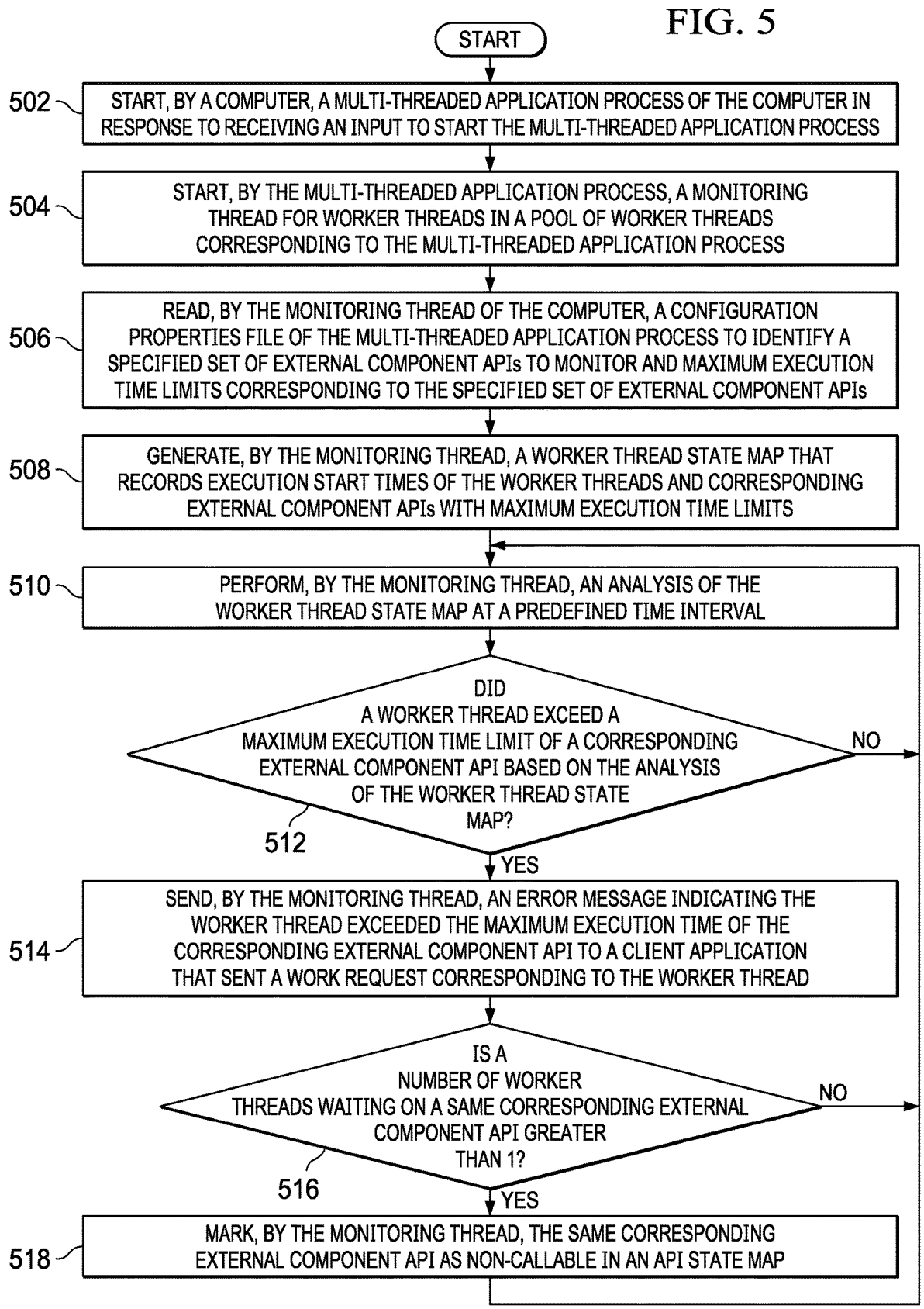

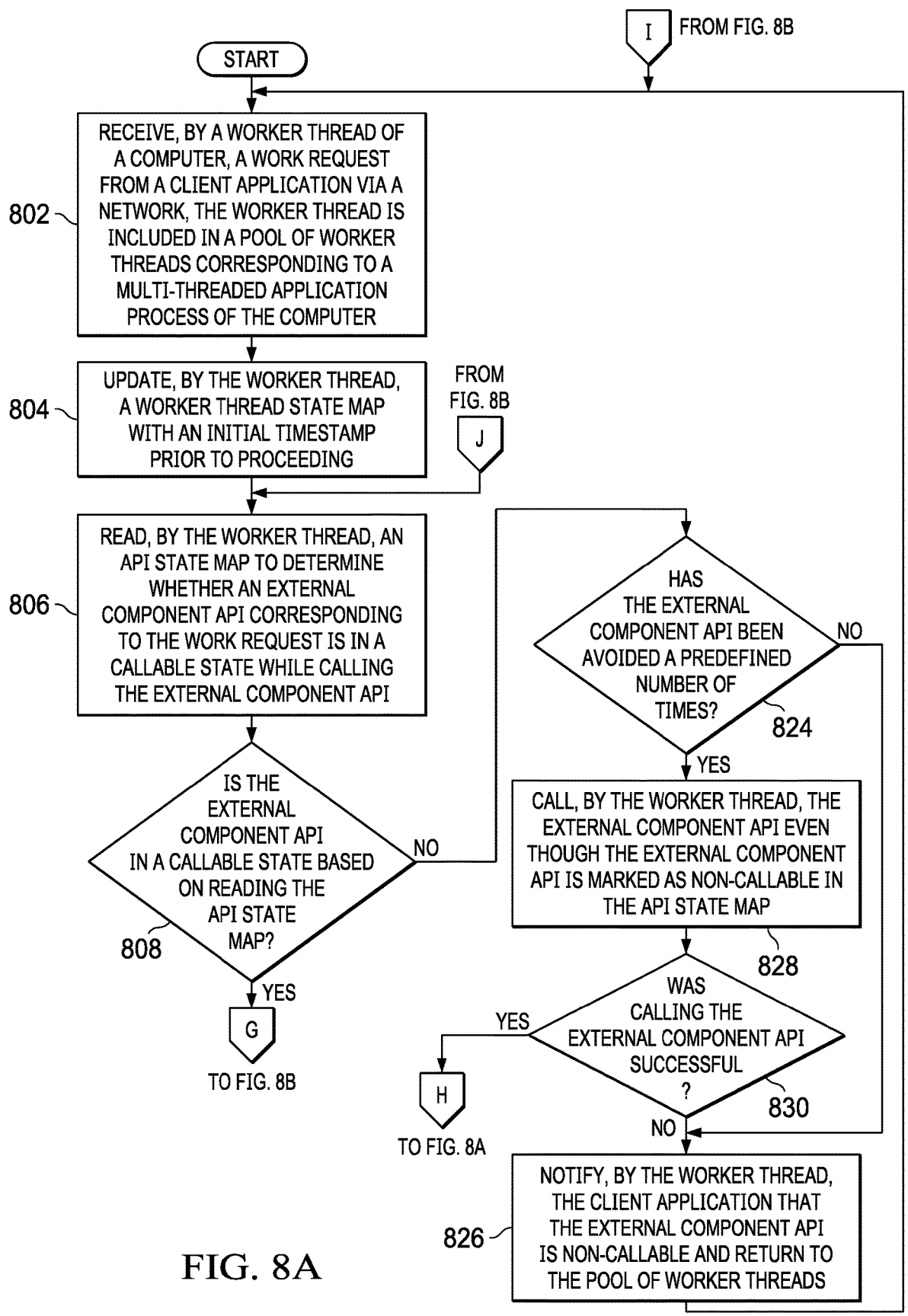

HANG DETECTION AND REMEDIATION IN A MULTI-THREADED APPLICATION PROCESS

BACKGROUND

1. Field

The disclosure relates generally to multi-threaded applications and more specifically to detecting hang of worker threads in a multi-threaded application process caused by non-callable external component application programming interfaces and performing remediation of detected worker threads in a hang or unresponsive state.

2. Description of the Related Art

Multi-threading allows multiple threads to exist within the context of a single application process. The multiple threads share resources of the application process, but are also able to execute independently. In other words, a multi-threaded application allows several threads to run, each thread running in its own set of functions. For example, a multi-threaded application can run step 1 in one thread and at the same time run step 2 in another thread. A thread is an independent unit of execution created within the context of an application process that is being executed. Depending on system hardware, threads can run fully parallel if the threads are distributed to their own processor. Each thread has its own program counter, system register, and function call stack. The program counter keeps track of instructions and tells which instruction to execute next. The system register keeps track of the current working variable of the thread. The function call stack contains the execution history of the thread.

SUMMARY

According to one illustrative embodiment, a computer-implemented method for detecting non-callable external component application programming interfaces is provided. A monitoring thread of a computer determines whether a first function call stack of a worker thread in a multi-threaded application of the computer matches a second function call stack of the worker thread. In response to the monitoring thread determining that the first function call stack matches the second function call stack of the worker thread, the monitoring thread identifies an external component application programming interface (API) corresponding to the worker thread from a function call stack of the worker thread. The monitoring thread marks the external component API corresponding to the worker thread as non-callable in an API state map. The monitoring thread marks the worker thread as being in a hang state. The monitoring thread terminates the worker thread in the hang state as a remediation action step to maintain performance of the computer. According to other illustrative embodiments, a computer system and computer program product for detecting non-callable external component application programming interfaces are provided.

BRIEF DESCRIPTION OF THE DRAWINGS

FIG. 5 is a flowchart illustrating a process for identifying non-callable application programming interfaces in accordance with an illustrative embodiment;

FIGS. 8A-8B are a flowchart illustrating a process for worker threads to interact with state maps in accordance with an illustrative embodiment.

DETAILED DESCRIPTION

Figure 1:
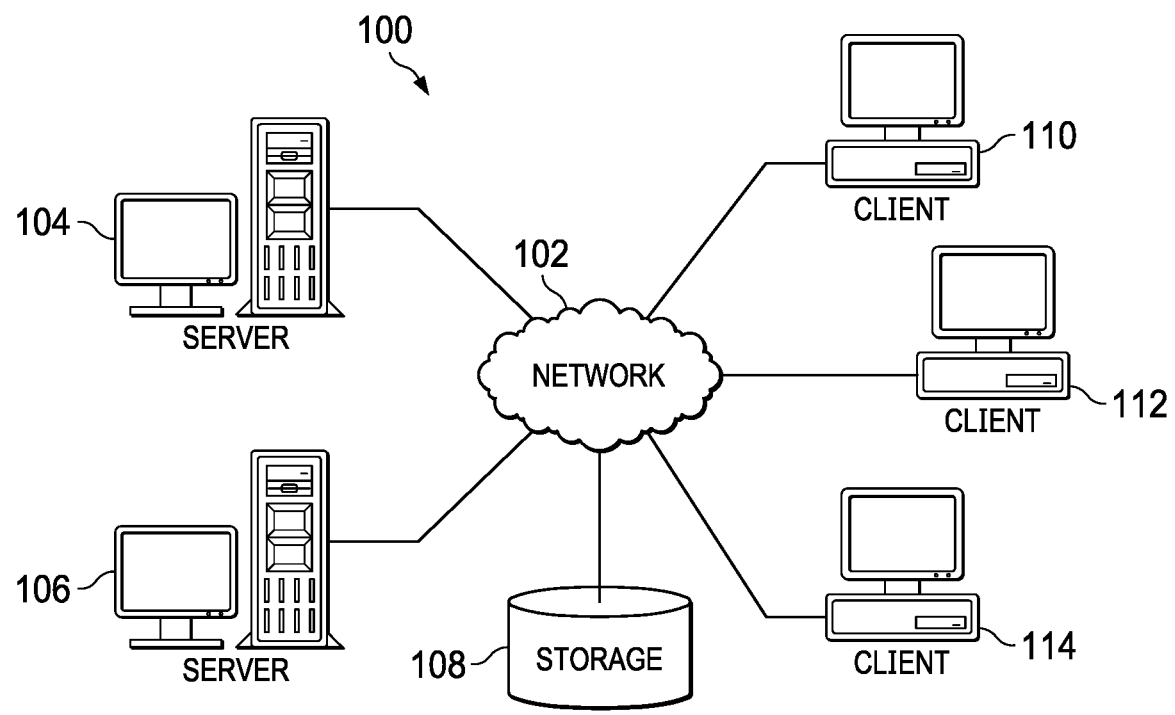
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
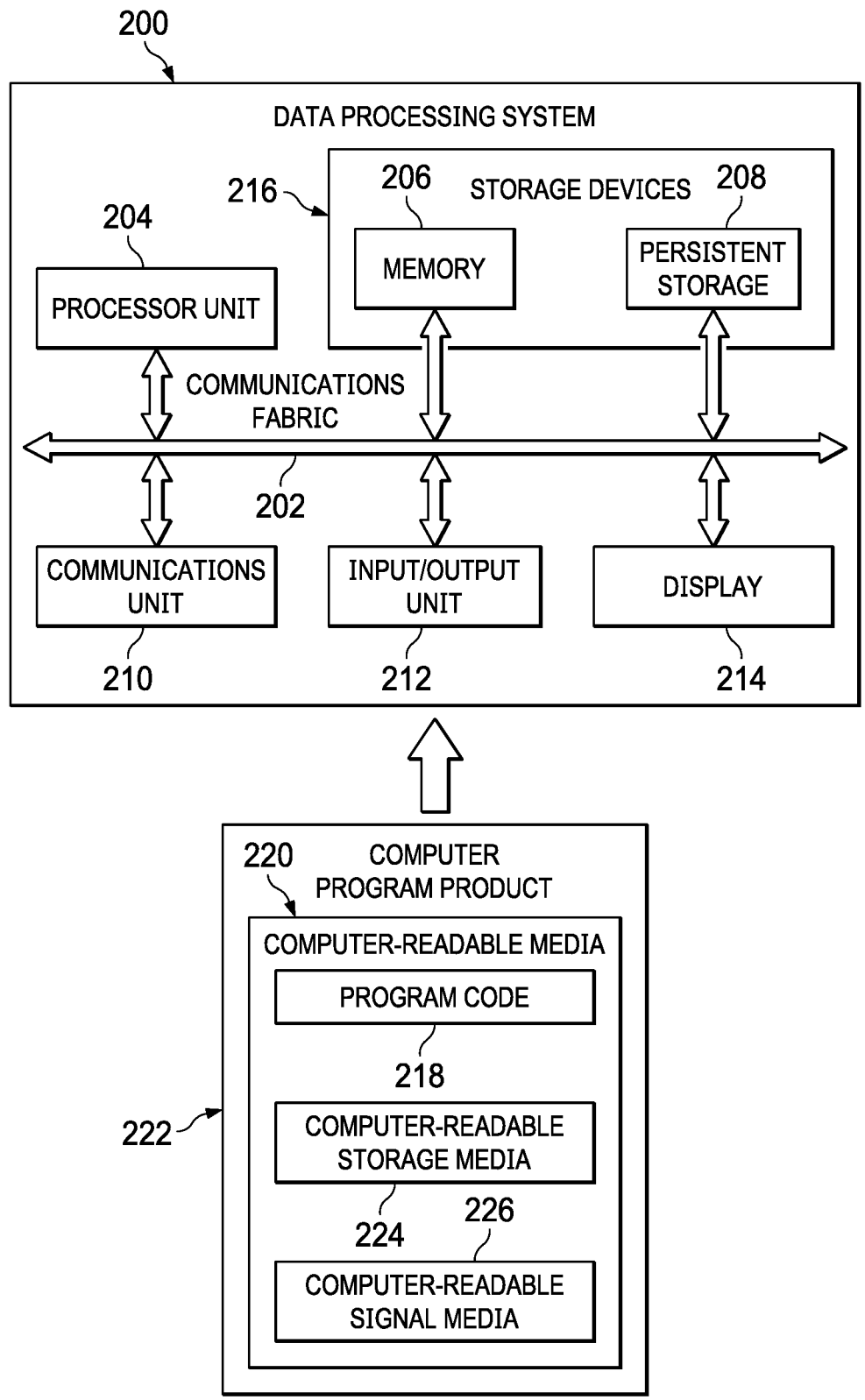
FIG. 2 is a diagram of a data processing system in which illustrative embodiments may be implemented.
Figure 3:
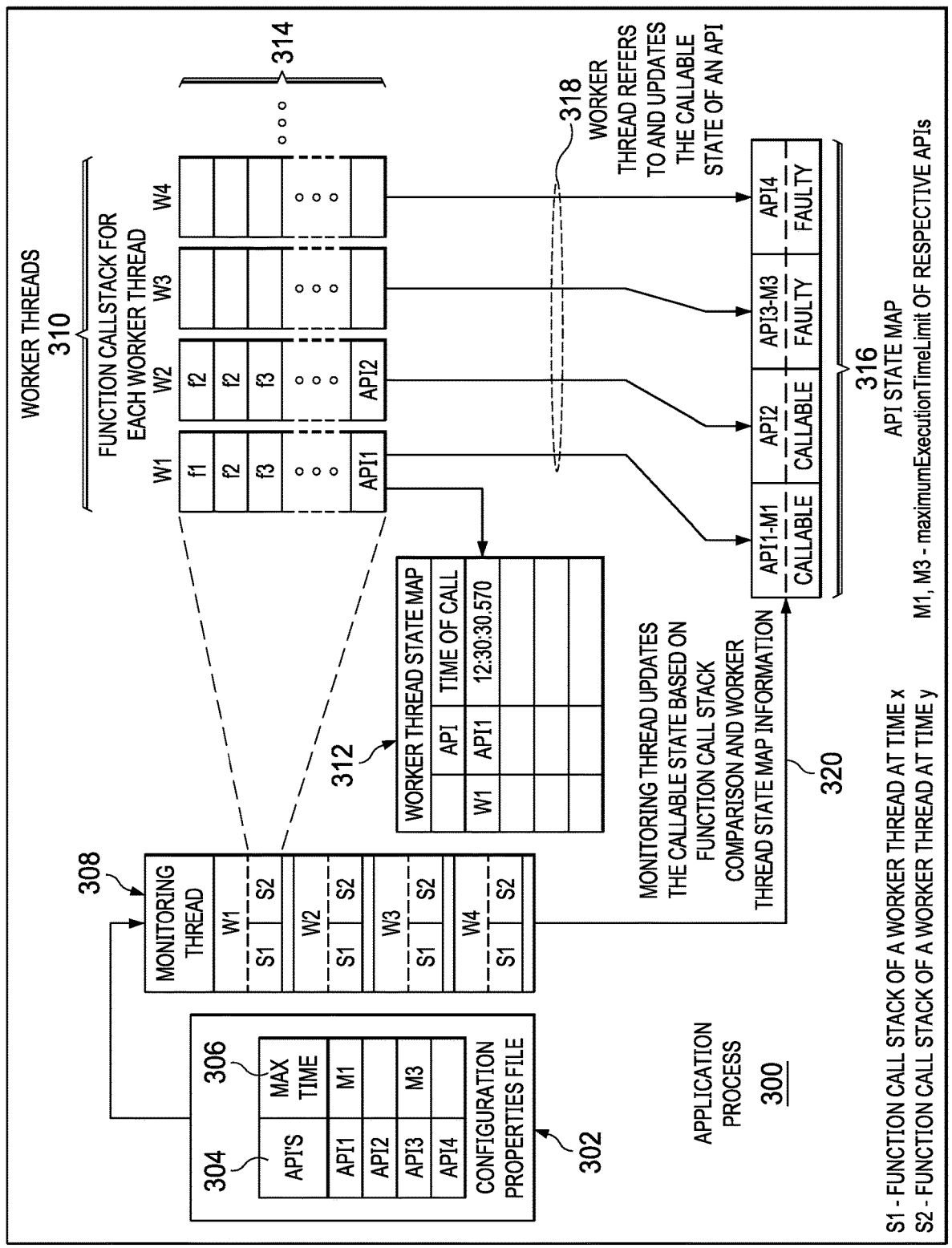
FIG. 3 is a diagram illustrating an example of application process components in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide a set of services to client devices. Server 104 and server 106 provide the set of services using multi-threaded applications. The set of services may be any type or combination of online services needing external component application programming interfaces (APIs) to process client work requests.

Further, each of server 104 and server 106 utilize a monitoring thread to monitor a pool of worker threads of respective multi-threaded applications. Server 104 and server 106 utilize the monitoring thread to detect whether respective worker threads are in a hang state (e.g., unresponsive) or taking longer than expected to process client work requests by comparing at least two function call stacks of each respective worker thread at a predefined time interval and which has exceeded its transaction timeout. Server 104 and server 106 may automatically terminate worker threads in a detected hang state as a remediation action step.

Furthermore, the monitoring thread can indicate whether a particular external component API is in a non-callable state (e.g., faulty or unresponsive) within an API state map based on identification of that particular external component API in function call stacks of worker threads in a detected hang state. Otherwise, the monitoring thread can indicate that a particular external component API is in a callable state (e.g., functional or responsive) in the API state map when worker threads are able to invoke and execute that particular external component API.

Also, it should be noted that server 104 and server 106 may each represent a cluster of servers in one or more data centers. Alternatively, server 104 and server 106 may each represent multiple computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart glasses, smart televisions, smart vehicles, smart appliances, gaming devices, and the like, with wire or wireless communication links to network 102. Users of clients 110, 112, and 114 may utilize clients 110, 112, and 114 to send work requests for services provided by server 104 and server 106 and receive responses to the work requests from server 104 and server 106 when worker threads finish processing the work requests.

Storage 108 is a network storage device capable of storing any type of data in a structured format or an unstructured format. The data may be, for example, associated with the services provided by server 104 and server 106. Thus, worker threads of server 104 and server 106 utilize an external component API to access the data to process the client work requests.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the processes of illustrative embodiments for detecting hung worker threads and non-callable external component APIs may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 218 is located in a functional form on computer-readable media 220 that is selectively removable and may be loaded onto or transferred to data processing system 200 for running by processor unit 204. Program code 218 and computer-readable media 220 form computer program product 222. In one example, computer-readable media 220 may be computer-readable storage media 224 or computer-readable signal media 226.

In these illustrative examples, computer-readable storage media 224 is a physical or tangible storage device used to store program code 218 rather than a medium that propagates or transmits program code 218. Computer-readable storage media 224 may include, for example, an optical or magnetic disc that is inserted or placed into a drive or other device that is part of persistent storage 208 for transfer onto a storage device, such as a hard drive, that is part of persistent storage 208. Computer-readable storage media 224 also may take the form of a persistent storage, such as a hard drive, a thumb drive, or a flash memory that is connected to data processing system 200.

Alternatively, program code 218 may be transferred to data processing system 200 using computer-readable signal media 226. Computer-readable signal media 226 may be, for example, a propagated data signal containing program code 218. For example, computer-readable signal media 226 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 220" can be singular or plural. For example, program code 218 can be located in computer-readable media 220 in the form of a single storage device or system. In another example, program code 218 can be located in computer-readable media 220 that is distributed in multiple data processing systems. In other words, some instructions in program code 218 can be located in one data processing system while other instructions in program code 218 can be located in one or more other data processing systems. For example, a portion of program code 218 can be located in computer-readable media 220 in a server computer while another portion of program code 218 can be located in computer-readable media 220 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 218.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

A typical integration product provides input and output connectors for several similar or disparate endpoints. Transactions or messages between these endpoints are processed via a workflow, which is a series of connected nodes or operations designed to perform certain actions of a transaction or message to complete a business logic. Each of these workflows runs as a thread within a multi-threaded application process. There could be several workflows deployed to a runtime engine, meaning that there are several threads performing these operations within the multi-threaded application process. These workflows are known as worker threads herein.

At times, it is possible for worker threads to become unresponsive (e.g., in a hang state) and connected clients requesting work will not receive responses within a defined time out period. Often, it is not possible to determine whether a worker thread is unresponsive (e.g., completely locked out) or the worker thread is still processing a client work request at a much slower pace than expected such that the worker thread cannot meet the client's time out period. Also, it is difficult to determine whether the issue is at an input connector (i.e., the source node receiving the work request from the client), an output connector (i.e., the destination node sending the response to the client), or an intermediate processing node.

Typically, integration products have standard application programming interfaces (APIs) for client applications to interact with. For example, a database provider may provide APIs, such as database connect, database fetch, and the like, for a client application to interact with a database. When a worker thread is in a hang state (i.e., unresponsive), it is possible to determine the external component API to which the worker thread is interacting with and the operation the worker thread is performing at the time of the hang from the thread's function call stack. Because the worker thread has become unresponsive (i.e., in a hang state), manual intervention by a system administrator is needed to determine the external component API that is causing the hang state to recover from the error. Also, if the application process has a pool comprised of "x" number of worker threads, then processing "x" number of client work requests by the multi-threaded application process can cause all "x" number of worker threads in the pool to enter a hang state.

The system administrator may resort to forcefully restarting the runtime application process in hope of recovering from the hang state causing the error. Forcefully restarting the runtime application process may only work as a stop gap, will not determine the root cause of the error, and will continue the risk of reoccurrence of the error. Further, forcefully restarting the runtime application process may create disruption to the hosted services causing customer dissatisfaction. In addition, because one of the worker threads in the pool is in a hang state, all of the other worker threads in the pool can also be affected due to the forceful restart of the entire runtime application process.

Debugging such errors may be difficult when these errors occur intermittently. Furthermore, it is not possible to run traces for long periods of time in a production environment in hope of capturing these errors in the traces because of the overhead involved with these traces. Moreover, it is difficult to generate dumps in the production environment for investigation of the function call stacks of the worker threads. Even if the dumps are generated, the dumps do not help in recovering the system, itself.

Some systems compare the current processing time against the start processing time of the worker thread to identify whether a worker thread is unresponsive (i.e., in a hang state). If a large difference exists between the current time and the start processing time of the worker thread, then these systems determine that the worker thread is unresponsive. However, these systems are not capable of determining whether the worker thread is really unresponsive or whether the worker thread is just taking more time than expected to complete the processing. As a result, these systems may incorrectly mark the working thread as unresponsive and perform a remediation action unnecessarily.

Illustrative embodiments detect the potential hang state of worker threads without needing to generate traces or dumps. Furthermore, illustrative embodiments resolve the hang state of an affected worker thread without having to forcefully restart the entire application process. Also, once a hang state is detected in one or more worker threads of the pool, illustrative embodiments identify the external component API causing the hang state from the function call stacks of the one or more hanging worker threads and use that information to prevent processing of subsequent client work requests from causing the same hang state on remaining worker threads in the pool.

Illustrative embodiments utilize a monitoring thread, which observes and monitors all or a portion of the worker threads in a pool of worker threads corresponding to a multi-threaded application process. The monitoring thread, at a preconfigured time interval, analyzes at least two function call stacks of each worker thread that is processing a client work request and which has exceeded its transaction timeout. If a function call stack of a particular worker thread does not change for at least two time intervals, then one of several possibilities may exist: 1) the worker thread is waiting on some external component API (e.g., a database, external web service request, message queue, network socket operation, or the like) that is slow in responding; 2) the worker thread is in a hang state due to deadlock or race condition; or 3) the worker thread is in an infinite loop. If the monitoring thread determines that the worker thread is waiting on some external component API that is slow to respond, then the monitoring thread can send a notification to the client application regarding delays caused by the external component API dependency. If the monitoring thread determines that the worker thread is in a hang state due to deadlock, race condition, or infinite loop, then the monitoring thread can automatically initiate termination of the hung worker thread for remediation. Thus, illustrative embodiments manage hang state errors at the worker thread level, thereby reducing the need to restart the entire multi-threaded application process, which can disrupt the remaining healthy worker threads in the pool.

In addition, if a worker thread has not completed its operation within a configured maximum execution time limit, then the monitoring thread determines whether a potential hang state exists for that particular worker thread. For example, the monitoring thread takes a plurality of function call stacks of the worker thread and detects whether the worker thread's state is changing or remains the same over time. If the monitoring thread determines that the function call stacks are different, then the monitoring thread determines that the worker thread is still executing its set of functions or operations. If the monitoring thread determines that the function call stacks are the same, then the monitoring thread determines that the worker thread is unresponsive in a hung state and marks the worker thread as such.

From the function call stack of the worker thread, the monitoring thread can identify the faulty external component API that is causing the hang state of the worker thread. The monitoring thread maintains and updates a map of faulty external component APIs causing worker thread hang states at any point in time for other worker threads in the pool to refer to prior to invoking those same faulty external component APIs and, therefore, prevent the other worker threads in the pool from entering the same hang state exhausting the pool of worker threads. Once the monitoring thread detects the faulty external component API from the function call stacks of the worker thread and places that external component API in the map of faulty external component APIs, the monitoring thread can generate and send an error message to at least one of the client application and system administrator for appropriate action.

The monitoring thread obtains a list of external component APIs, which a user (e.g., an application developer, system administrator, or the like) wants the monitoring thread to observe and monitor, from a configuration property file corresponding to a particular multi-threaded application process. The monitoring thread maintains an external component API state map that indicates whether each respective external component API included in the list is in a callable (e.g., functioning) state or a non-callable (e.g., faulty) state at any given point in time. Before a worker thread invokes a particular external component API, the worker thread can refer to the external component API state map to determine whether that particular external component API is in a callable or non-callable state. If the worker thread determines that that particular external component API is in a callable state based on information in the API state map, then the worker thread can invoke that particular external component API to execute its set of functions or operations. If the worker thread determines that that particular external component API is in a non-callable state based on the information in the API state map, then the worker thread can respond to the client application with an error message indicating that the external component API is unresponsive or faulty.

For example, if the monitoring thread detects that a database connect API is faulty from at least two function call stacks of a hanging worker thread and indicates in the external component API state map that the database connect API is in a non-callable state, then other worker threads in the pool can first reference the map to determine whether that particular external component API is currently in a non-callable state and then act accordingly.

Thus, illustrative embodiments provide early detection of faulty APIs corresponding to a transaction workflow to prevent worker thread unresponsiveness (i.e., hang) using an external component API state map and a worker thread state map. In addition, illustrative embodiments allow early exit of the transaction workflow by notifying invoking client applications of the error situation. Further, illustrative embodiments control and prevent worker thread exhaustion of a thread pool corresponding to the multi-threaded application process by marking APIs as callable or non-callable in the API state map, thereby preventing worker threads from invoking faulty APIs. Furthermore, illustrative embodiments are capable of differentiating between a hung worker thread and slow processing worker thread by comparing function call stacks of respective worker threads.

Thus, illustrative embodiments provide one or more technical solutions that overcome a technical problem with detecting hung worker threads caused by non-callable/faulty external component APIs. As a result, these one or more technical solutions provide a technical effect and practical application in the field of multi-threaded applications.

With reference now to FIG. 3, a diagram illustrating an example of application process components is depicted in accordance with an illustrative embodiment. Application process 300 represents a multi-threaded application process. Application process 300 may be hosted by a computer, such as, for example, server 104 in FIG. 1 or data processing system 200 in FIG. 2. In addition, application process 300 may represent any type of multi-threaded application process. Further, application process 300 may perform a set of services to requesting clients, such as, for example, clients 110, 112, and 114 in FIG. 1.

Application process 300 maintains configuration property file 302 that specifies set of external component APIs 304 to monitor, along with optional maximum execution time limit 306 of a given external component API. Monitoring thread 308 maintains execution start time of a given worker thread of worker threads 310, along with a corresponding API identifier and maximum execution time limit, within worker thread state map 312. A worker thread (e.g., W1) logs its execution start time (e.g., 12:30:30) of a particular external component API (e.g., API1) in specified set of external component APIs 304, which is configured with a maximum execution time limit (e.g., 570 ms), within worker thread state map 312 just before invoking that particular external component API. After the worker thread completes execution of that particular external component API, the worker thread removes the corresponding entry from worker thread state map 312.

Monitoring thread 308 monitors worker thread state map 312 and determines whether a given worker thread listed in the map is waiting on an external component API more than the configured maximum execution time limit for that external component API. If the given worker thread has not completed its execution of that external component API within the configured maximum execution time limit, then monitoring thread 308 notifies the invoking client application of the error so that the invoking client application can take appropriate action immediately, without waiting for a response from the worker thread. If a predefined number of worker threads (e.g., 2 or more) is waiting on the same external component API more than its configured maximum execution time limit, then monitoring thread 308 marks that particular external component API as non-callable (e.g., faulty) in API state map 316 and notifies a user, such as, for example, a system administrator, regarding the error corresponding to that particular external component API.

If a given worker thread completes its execution of a particular external component API after the configured maximum execution time limit of that particular external component API, then that worker thread can avoid execution of the remaining part of the workflow as the worker thread is not going to complete the transaction within the time out limit of the invoking client application. In other words, the invoking client application, itself, terminated the transaction because it could not wait on a response from the worker thread. As a result, the worker thread does not need to complete the remaining portion of the workflow.

If a given worker thread has not completed execution of a work request within "n" amount of time and an entry in worker thread state map 312 corresponding to that worker thread indicates the worker thread has been waiting a long time on an external component API, then monitoring thread 308 marks that particular external component API as non-callable and considers that worker thread as hung or slow processing. If a given worker thread W1 has not completed execution within "n" amount of time and worker thread state map 312 does not include an entry for the external component API that worker thread W1 is currently executing, then monitoring thread 308 determines whether worker thread W1 is in a hang state by performing the following steps:

Get function call stack of worker thread W1 at time "x", save as—S1.
    Loop user-defined "n" number of times:
        Wait for "z" milliseconds.
        Get function call stack of worker thread W1 at time "y", save as—S2.

---

Do text comparison of S1 and S2.
  If text does not match, then worker thread W1 is not in a hang state.
    Return False.
  else
    text matches, repeat loop.
End Loop.

---

If monitoring thread 308 determines that the text does not match (i.e., is different) between function call stack S1 and function call stack S2 of worker thread W1 based on the comparison, then monitoring thread 308 determines that worker thread W1 is not in a hang state and may be taking more time to complete execution of the operation (i.e., monitoring thread 308 determines that worker thread W1 is a slow processing thread). If monitoring thread 308 determines that the text does match (i.e., is the same) between function call stack S1 and function call stack S2 of worker thread W1 based on the comparison, then monitoring thread 308 determines that worker thread W1 is waiting on the same function for a long time. Afterward, monitoring thread 308 can determine whether the hang or slowness is caused by calling a particular external component API specified in configuration properties file 302 so that other worker threads in the pool can be prevented from invoking that same faulty external component API.

Monitoring thread 308 identifies the faulty external component API in function call stacks 314 of hanging worker threads and searches set of external component APIs 304 specified in configuration properties file 302 for its presence. If the faulty external component API is listed in specified set of external component APIs 304, then monitoring thread 308 marks that particular external component API (e.g., API3) as faulty in API state map 316. Also, monitoring thread 308 can log the potential issue of the external component or notify the system administrator regarding the potential issue for appropriate action. In addition, monitoring thread 308 can automatically perform a remediation action step by terminating worker threads in a hang state and then generating new worker threads to add to the pool to have the required number of processing threads.

At 318, worker threads before invoking a particular external component API can refer to API state map 316 to determine whether the worker threads should invoke that particular external component API (i.e., that particular external component API is in a callable state) or send an error message to the client application indicating that particular external component API is in a non-callable state (e.g., faulty). A worker thread can still invoke a particular external component API even if it is marked as non-callable in API state map 316 after avoiding invoking that particular API a predefined number of times to determine whether the error has been resolved or not. If the worker thread completes execution of that particular API, then the worker thread updates API state map 316 to indicate that that particular API is now in a callable state. Further, at 320, monitoring thread 308 can also update callable states of respective external component APIs in API state map 316 based on comparison of at least two function call stacks taken at different times of each respective worker thread processing a client work request that exceeded the transaction timeout and information in worker thread state map 312.

Figure 4:
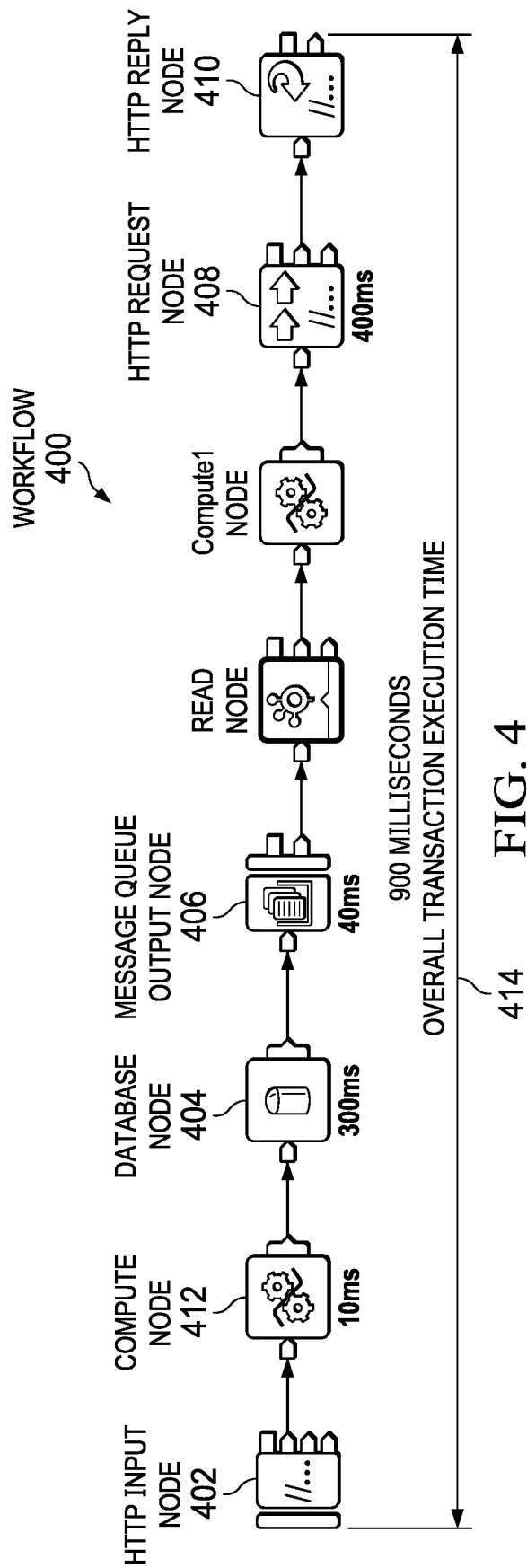
FIG. 4 is a diagram illustrating an example of a workflow in accordance with an illustrative embodiment.

With reference now to FIG. 4, a diagram illustrating an example of a workflow is depicted in accordance with an illustrative embodiment. Workflow 400 may be implemented in a computer, such as, for example, server 104 in FIG. 1 or data processing system 200 in FIG. 2.

Workflow 400 implements a business transaction or logic via a series of connected operations called nodes in response to a client work request. Each node is configured to perform a certain set of operations or functions using APIs. For example, HTTP Input node 402 is configured to listen for an incoming webservice request from an invoking client application. HTTP Input node 402 uses socket APIs to listen on a particular port. HTTP Input node 402 marks the beginning of the business transaction. Database node 404 is configured to interact with a database system using database APIs. Message Queue Output node 406 is configured to interact with a messaging system using messaging queue APIs. HTTP Request node 408 is configured to invoke an external webservice and waits for a response via the socket APIs. HTTP Reply node 410 is configured to respond back the invoking client application using the socket APIs. HTTP Reply node 410 is the final node that marks the end of the business transaction.

Application developers determine the overall transaction time of this business logic based on the type of operations involved in the overall end-to-end transaction. For example, if the operation corresponding to Database node 404 takes 300 milliseconds (ms), the operation corresponding to Message Queue Output node 406 takes 40 ms, the operation corresponding to HTTP Request node 408 takes 400 ms, and some in-memory operations, such as performed by Compute node 412, take 10 ms, then the overall transaction time of one business request by an invoking client application is generally defined as the sum of time taken by all of the operations in the workflow. In this example of workflow 400, overall transaction execution time 414 is 900 ms.

Typically, application developers arrive at these numbers based on several load tests, performance tests, and available system resources (e.g., processor, memory, storage, network, and the like). In a production environment, as long as transactions are completing within the defined overall transaction execution time (i.e., 900 ms in this example or within a defined grace period such as within 1 second), no cause for concern exists. However, if a transaction takes longer than the defined overall transaction execution time or the transaction gets timed out (i.e., the invoking client application times out and terminates the transaction), then a cause for concern exists in terms of whether a worker thread of the application process is in a hang state or is too slow to perform the operation due to an external component API (e.g., database, message queue, external web service, or the like) being faulty (i.e., not responding). Illustrative embodiments, using a monitoring thread, such as, for example, monitoring thread 308 in FIG. 3, are capable of detecting a hang in the transaction processing cycle and providing an automated remediation action to avoid complete collapse of the entire application process.

With reference now to FIG. 5, a flowchart illustrating a process for identifying non-callable application programming interfaces is shown in accordance with an illustrative embodiment. The process shown in FIG. 5 may be implemented in a computer, such as, for example, server 104 in FIG. 1 or data processing system 200 in FIG. 2.

The process begins when the computer starts a multi-threaded application process of the computer in response to receiving an input to start the multi-threaded application process (step 502). Afterward, the multi-threaded application process of the computer starts a monitoring thread for worker threads in a pool of worker threads corresponding to the multi-threaded application process (step 504).

The monitoring thread reads a configuration properties file of the multi-threaded application process to identify a specified set of external component APIs to monitor and maximum execution time limits corresponding to the specified set of external component APIs (step 506). In addition, the monitoring thread generates a worker thread state map that records execution start times of the worker threads and corresponding external component APIs with maximum execution time limits (step 508). At a predefined time interval, the monitoring thread performs an analysis of the worker thread state map (step 510).

The monitoring thread makes a determination as to whether a worker thread exceeded a maximum execution time limit of a corresponding external component API based on the analysis of the worker thread state map (step 512). If the monitoring thread determines that a worker thread did not exceed a maximum execution time limit of a corresponding external component API based on the analysis of the worker thread state map, no output of step 512, then the process returns to step 510 where the monitoring thread waits for expiration of the next predefined time interval. If the monitoring thread determines that a worker thread did exceed the maximum execution time limit of the corresponding external component API based on the analysis of the worker thread state map, yes output of step 512, then the monitoring thread sends an error message indicating the worker thread exceeded the maximum execution time limit of the corresponding external component API to a client application that sent a work request corresponding to the worker thread (step 514).

Further, the monitoring thread makes a determination as to whether a number of worker threads waiting on a same corresponding external component API is greater than 1 (step 516). If the monitoring thread determines that the number of worker threads waiting on the same corresponding external component API is not greater than 1, no output of step 516, then the process returns to step 510 where the monitoring thread waits for expiration of the next predefined time interval. If the monitoring thread determines that the number of worker threads waiting on the same corresponding external component API is greater than 1, yes output of step 516, then the monitoring thread marks the same corresponding external component API as non-callable in an API state map (step 518). Thereafter, the process returns to step 510 where the monitoring thread waits for expiration of the next predefined time interval.

Figure 6A:
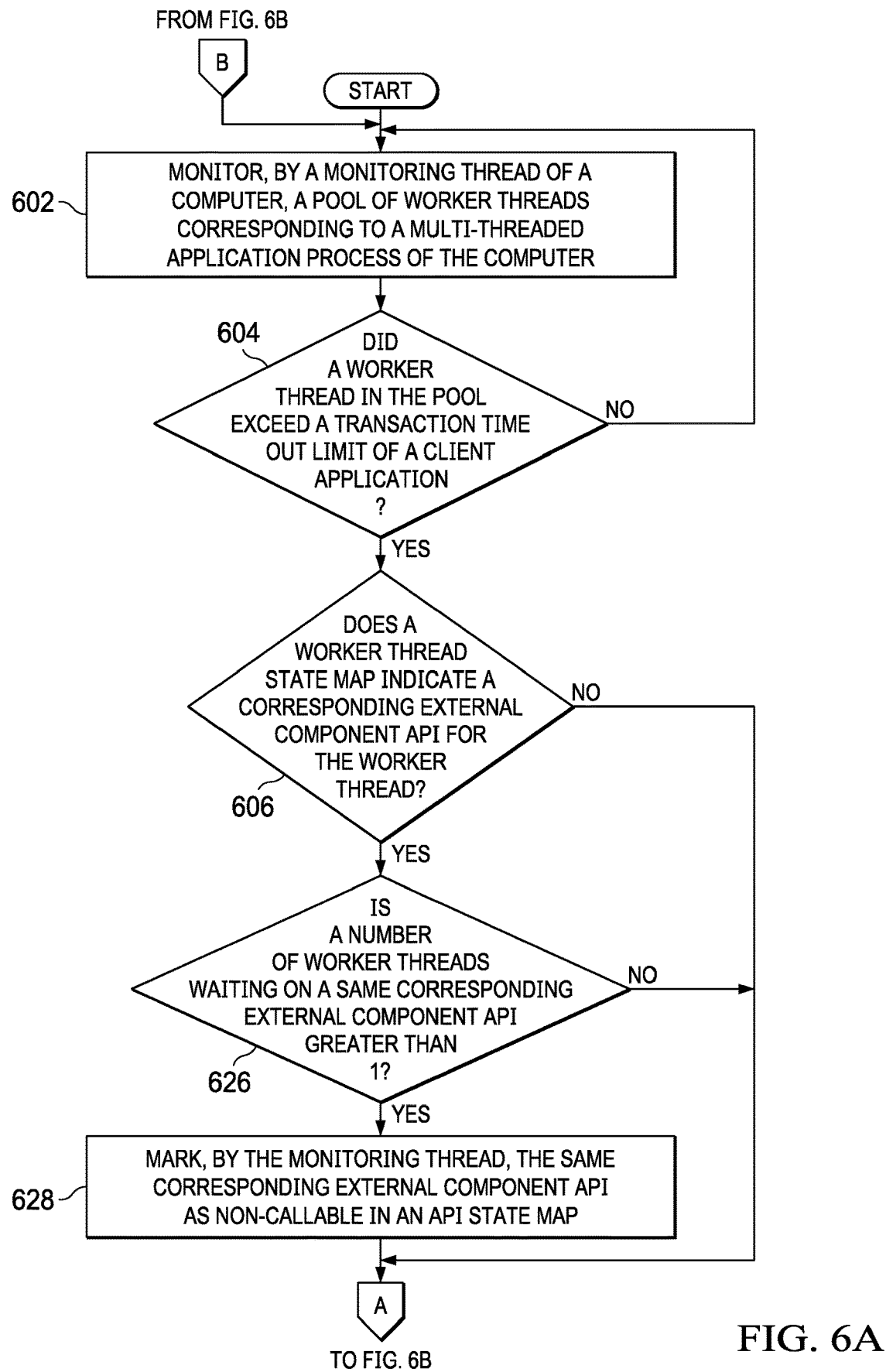
FIGS. 6A-6B are a flowchart illustrating a process for performing remediation of worker threads in a hang state in accordance with an illustrative embodiment.
Figure 6B:
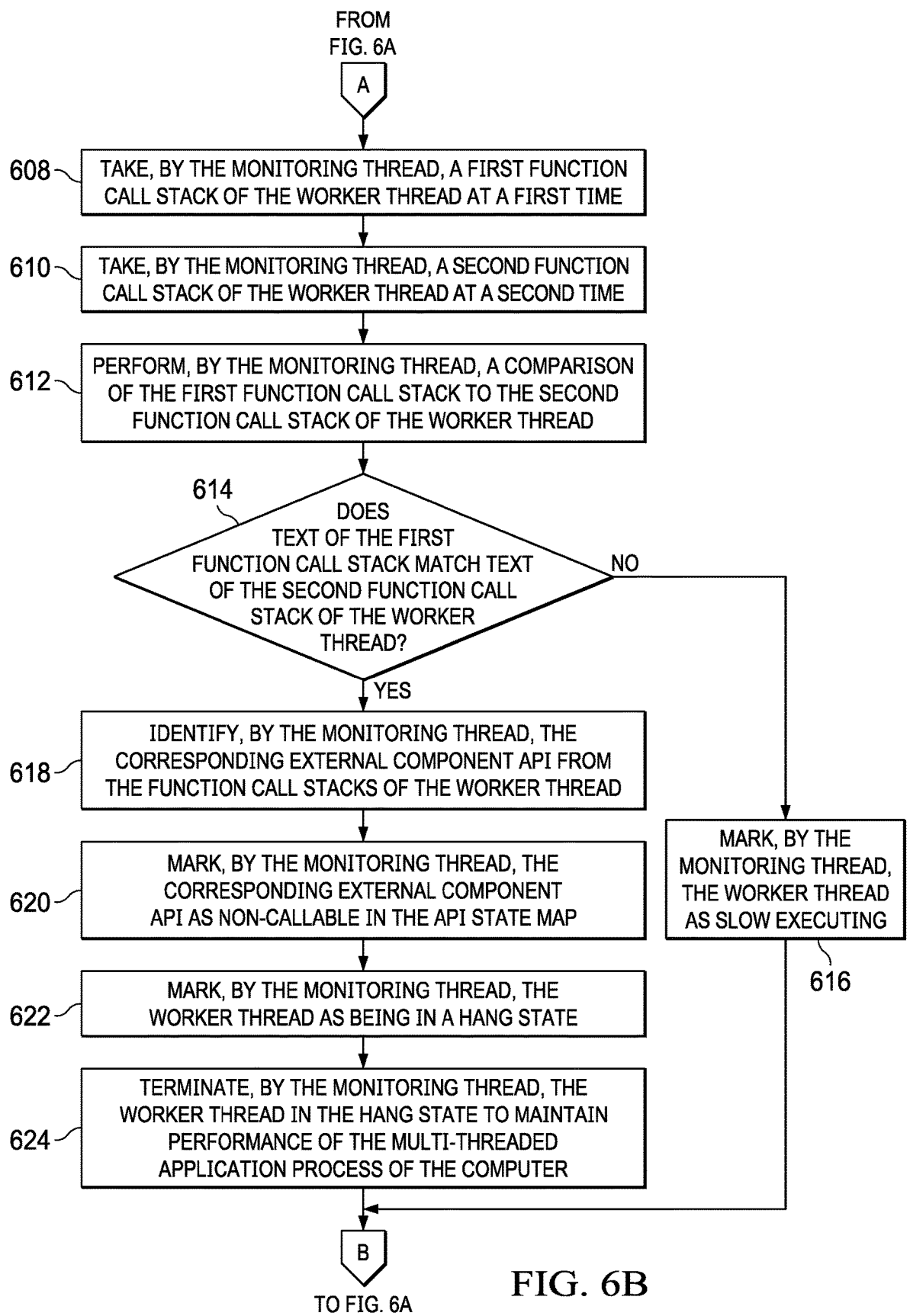

With reference now to FIGS. 6A-6B, a flowchart illustrating a process for performing remediation of worker threads in a hang state is shown in accordance with an illustrative embodiment. The process shown in FIGS. 6A-6B may be implemented in a computer, such as, for example, server 104 in FIG. 1 or data processing system 200 in FIG. 2.

The process begins when a monitoring thread of the computer monitors a pool of worker threads corresponding to a multi-threaded application process of the computer (step 602). The monitoring thread makes a determination as to whether a worker thread in the pool exceeded a transaction time out limit of a client application (step 604). If the monitoring thread determines that no worker thread in the pool exceeded a transaction time out limit of a client application, no output of step 604, then the process returns to step 602 where the monitoring thread continues to monitor the pool of worker threads. If the monitoring thread determines that a worker thread in the pool did exceed the transaction time out limit of the client application, yes output of step 604, then the monitoring thread makes a determination as to whether a worker thread state map indicates a corresponding external component API for the worker thread (step 606).

If the monitoring thread determines that the worker thread state map does not indicate a corresponding external component API for the worker thread, no output of step 606, then the monitoring thread takes a first function call stack of the worker thread at a first time (step 608). Subsequently, the monitoring thread takes a second function call stack of the worker thread at a second time (step 610). Afterward, the monitoring thread performs a comparison of the first function call stack to the second function call stack of the worker thread (step 612).

The monitoring thread makes a determination as to whether text of the first function call stack matches text of the second function call stack of the worker thread (step 614). If the monitoring thread determines that the text of the first function call stack does not match the text of the second function call stack of the worker thread, no output of step 614, then the monitoring thread marks the worker thread as slow executing (step 616). Thereafter, the process returns to step 602 where the monitoring thread continues to monitor the pool of worker threads. If the monitoring thread determines that the text of the first function call stack does match the text of the second function call stack of the worker thread, yes output of step 614, then the monitoring thread identifies the corresponding external component API from the function call stacks of the worker thread (step 618).

Afterward, the monitoring thread marks the corresponding external component API as non-callable in the API state map (step 620). Further, the monitoring thread marks the worker thread as being in a hang state (step 622). Moreover, the monitoring thread terminates the worker thread in the hang state as a remediation action step to maintain performance of the multi-threaded application process of the computer (step 624). Thereafter, the process returns to step 602 where the monitoring thread continues to monitor the pool of worker threads.

Returning again to step 606, if the monitoring thread determines that the worker thread state map does indicate a corresponding external component API for the worker thread, yes output of step 606, then the monitoring thread makes a determination as to whether a number of worker threads waiting on a same corresponding external component API is greater than a defined threshold number (e.g., 1) (step 626). If the monitoring thread determines that the number of worker threads waiting on the same corresponding external component API is not greater than the defined threshold number, no output of step 626, then the process returns to step 608 where the monitoring thread takes and compares function call stacks of the worker thread. If the monitoring thread determines that the number of worker threads waiting on the same corresponding external component API is greater than the defined threshold number, yes output of step 626, then the monitoring thread marks the same corresponding external component API as non-callable in an API state map to prevent other worker threads in the pool from invoking that same non-callable external component API and avoiding the other worker threads from entering a hang state (step 628). Thereafter, the process returns to step 608 where the monitoring thread takes and compares function call stacks of the worker thread.

Figure 7A:
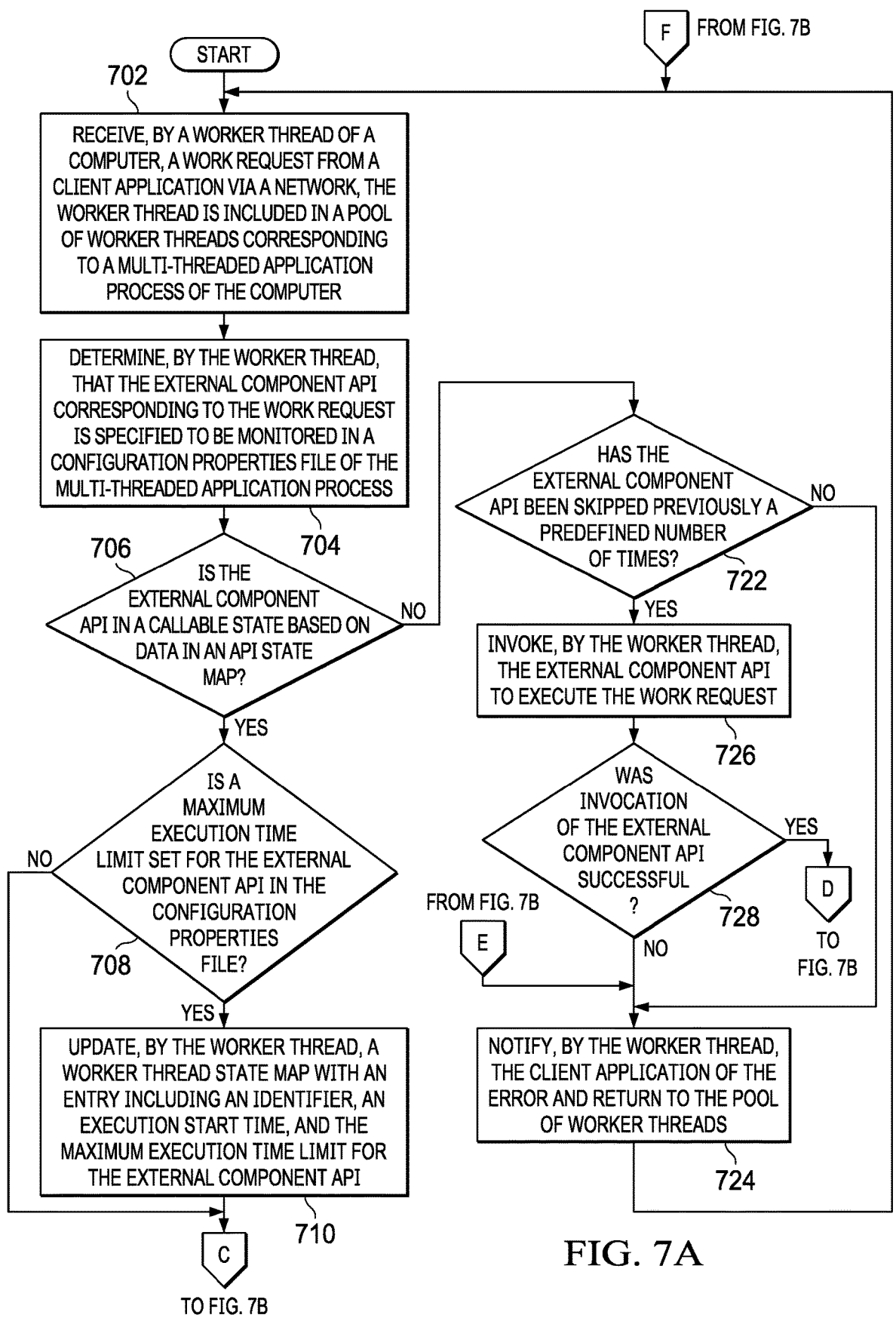
FIGS. 7A-7B are a flowchart illustrating a process for preventing worker thread hang in accordance with an illustrative embodiment.
Figure 7B:
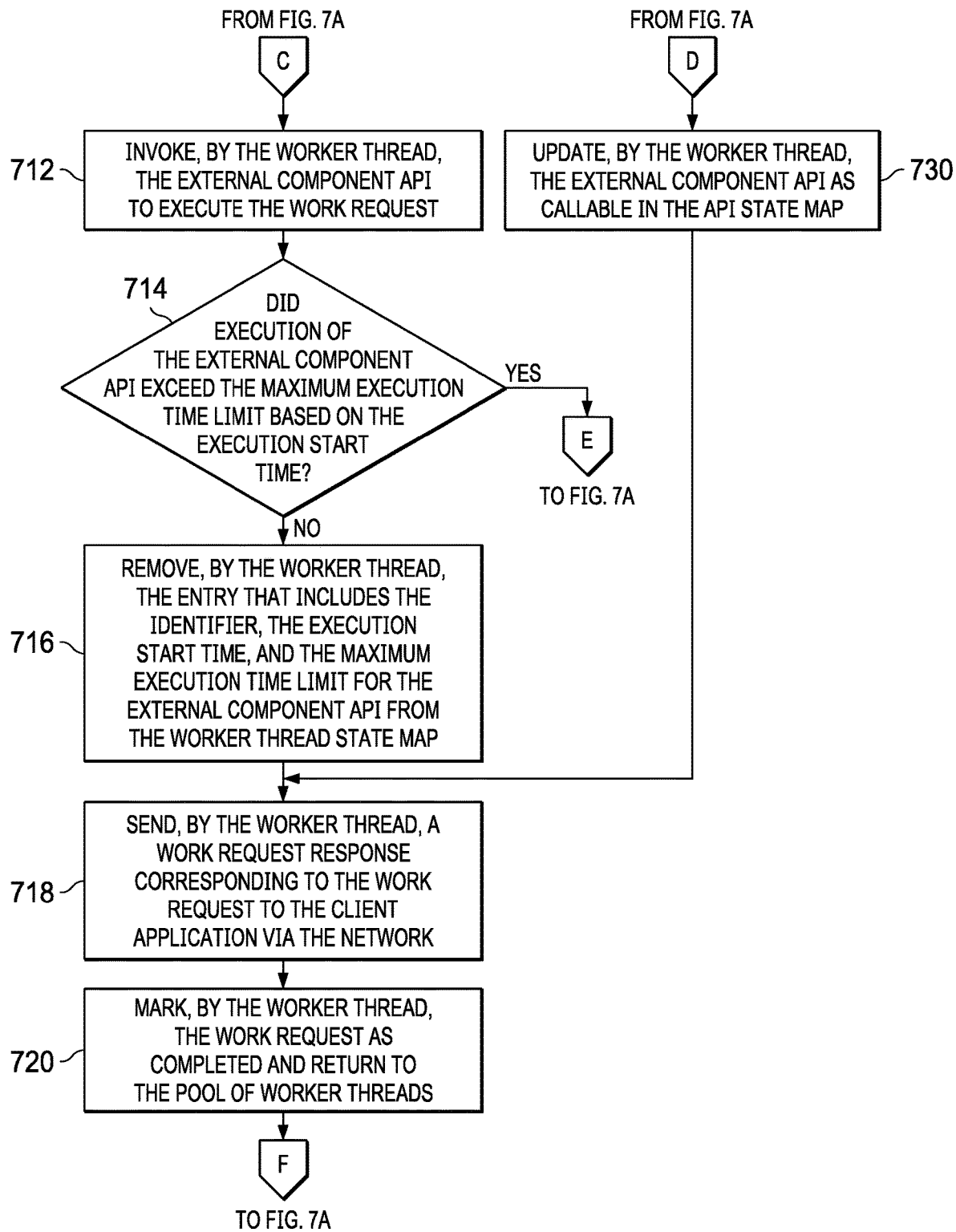

With reference now to FIGS. 7A-7B, a flowchart illustrating a process for preventing worker thread hang is shown in accordance with an illustrative embodiment. The process shown in FIGS. 7A-7B may be implemented in a computer, such as, for example, server 104 in FIG. 1 or data processing system 200 in FIG. 2.

The process begins when a worker thread of the computer receives a work request from a client application via a network (step 702). The worker thread is included in a pool of worker threads corresponding to a multi-threaded application process of the computer. The worker thread determines that the external component API corresponding to the work request is specified to be monitored in a configuration properties file of the multi-threaded application process (step 704).

Subsequently, the worker thread makes a determination as to whether the external component API is in a callable state based on data in an API state map (step 706). If the worker thread determines that the external component API is in a callable state based on data in an API state map, yes output of step 706, then the worker thread makes a determination as to whether a maximum execution time limit is set for the external component API in the configuration properties file (step 708). If the worker thread determines that no maximum execution time limit is set for the external component API in the configuration properties file, no output of step 708, then the process proceeds to step 712. If the worker thread determines that the maximum execution time limit is set for the external component API in the configuration properties file, yes output of step 708, then the worker thread updates a worker thread state map with an entry that includes an identifier, an execution start time, and the maximum execution time limit for the external component API (step 710).

In addition, the worker thread invokes the external component API to execute the work request (step 712). Afterward, the worker thread makes a determination as to whether execution of the external component API exceeded the maximum execution time limit based on the execution start time (step 714). If the worker thread determines that the execution of the external component API did exceed the maximum execution time limit based on the execution start time, yes output of step 714, then the process proceeds to step 724. If the worker thread determines that the execution of the external component API did not exceed the maximum execution time limit based on the execution start time, no output of step 714, then the worker thread removes the entry that includes the identifier, the execution start time, and the maximum execution time limit for the external component API from the worker thread state map (step 716).

Further, the worker thread sends a work request response corresponding to the work request to the client application via the network (step 718). Furthermore, the worker thread marks the work request as completed and returns to the pool of worker threads (step 720). Thereafter, the process returns to step 702 where the worker thread waits to receive another client work request.

Returning again to step 706, if the worker thread determines that the external component API is not in a callable state based on data in an API state map, no output of step 706, then the worker thread makes a determination as to whether the external component API has been skipped previously a predefined number of times (step 722). If the worker thread determines that the external component API has not been skipped previously the predefined number of times, no output of step 722, then the worker thread notifies the client application of the error and returns to the pool of worker threads (step 724). Thereafter, the process returns to step 702 where the worker thread waits to receive another client work request. If the worker thread determines that the external component API has been skipped previously the predefined number of times, yes output of step 722, then the worker thread invokes the external component API to execute the work request (step 726).

Afterward, the worker thread makes a determination as to whether invocation of the external component API was successful (step 728). If the worker thread determines that the invocation of the external component API was not successful, no output of step 728, then the process returns to step 724 where the worker thread notifies the client application of the error and returns to the pool of worker threads. If the worker thread determines that the invocation of the external component API was successful, yes output of step 728, then the worker thread updates the external component API as callable in the API state map (step 730). Thereafter, the process returns to step 718 where the worker thread sends the work request response to the client application.

Figure 8B:
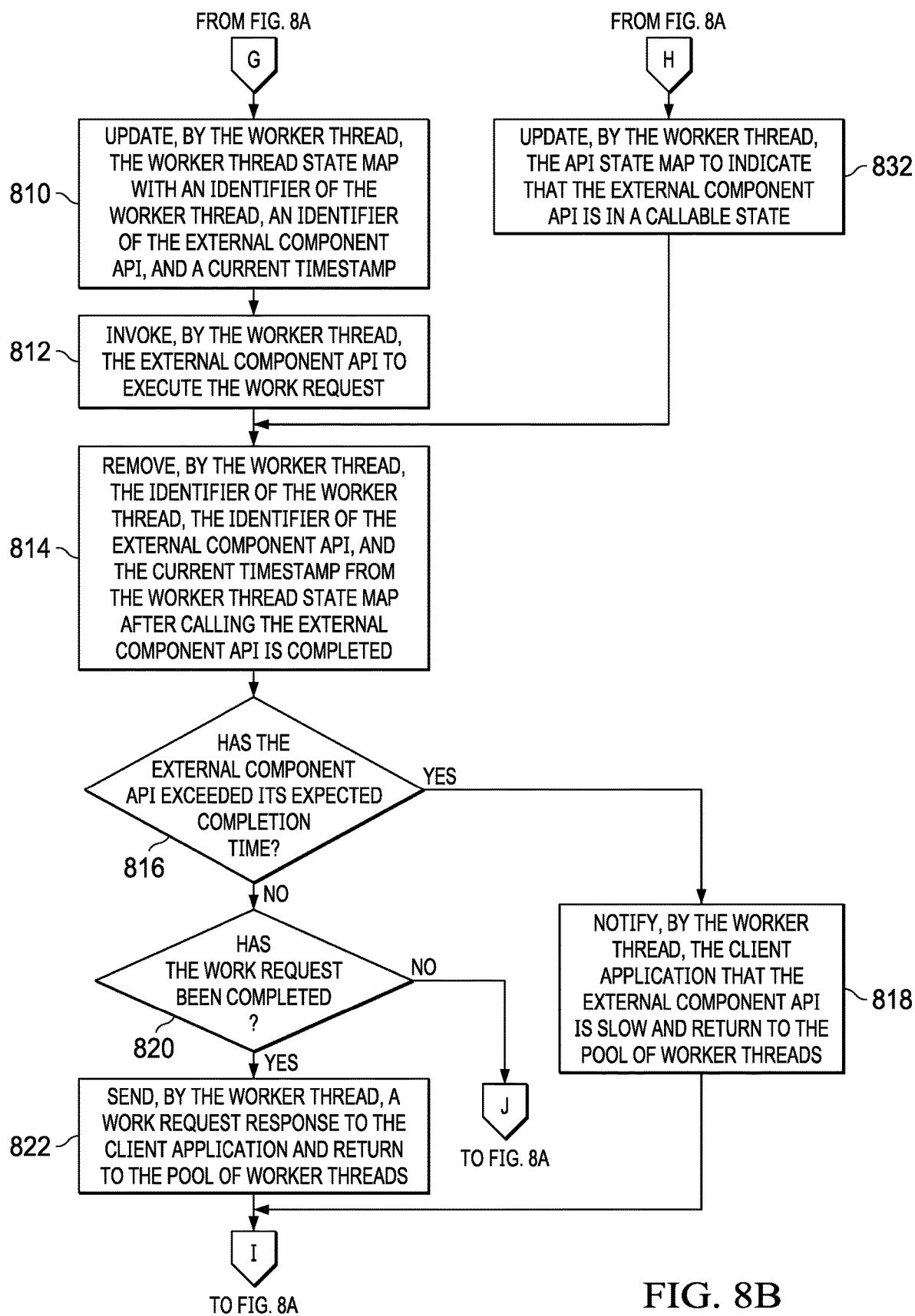

With reference now to FIGS. 8A-8B, a flowchart illustrating a process for worker threads to interact with state maps is shown in accordance with an illustrative embodiment. The process shown in FIGS. 8A-8B may be implemented in a computer, such as, for example, server 104 in FIG. 1 or data processing system 200 in FIG. 2.

The process begins when a worker thread of the computer receives a work request from a client application via a network (step 802). The worker thread is included in a pool of worker threads corresponding to a multi-threaded application process of the computer. In response to receiving the work request, the worker thread updates a worker thread state map with an initial timestamp prior to proceeding (step 804). In addition, the worker thread reads an API state map to determine whether an external component API corresponding to the work request is in a callable state while calling the external component API (step 806).

The worker thread makes a determination as to whether the external component API is in a callable state based on reading the API state map (step 808). If the worker thread determines that the external component API is in a callable state, yes output of step 808, then the worker thread updates the worker thread state map with an identifier of the worker thread, an identifier of the external component API, and a current timestamp (step 810). Further, the worker thread invokes the external component API to execute the work request (step 812). Furthermore, the worker thread removes the identifier of the worker thread, the identifier of the external component API, and the current timestamp from the worker thread state map after calling the external component API is completed (step 814).

Moreover, the worker thread makes a determination as to whether the external component API exceeded its expected completion time (step 816). If the worker thread determines that the external component API did exceed its expected completion time, yes output of step 816, then the worker thread notifies the client application that the external component API is slow and returns to the pool of worker threads (step 818). Thereafter, the process returns to step 802 where the worker thread waits for another client work request. If the worker thread determines that the external component API did not exceed its expected completion time, no output of step 816, then the worker thread makes a determination as to whether the work request has been completed (step 820).

If the worker thread determines that the work request has not been completed, no output of step 820, then the process returns to step 806 where the worker thread reads the API state map. If the worker thread determines that the work request has been completed, yes output of step 820, then the worker thread sends a work request response to the client application and returns to the pool of worker threads (step 822). Thereafter, the process returns to step 802 where the worker thread waits for another client work request.

Returning again to step 808, if the worker thread determines that the external component API is not in a callable state, no output of step 808, then the worker thread makes a determination as to whether the external component API has been avoided a predefined number of times (step 824). If the worker thread determines that the external component API has not been avoided the predefined number of times, no output of step 824, then the worker thread notifies the client application that the external component API is non-callable and returns to the pool of worker threads (step 826). Thereafter, the process returns to step 802 where the worker thread waits for another client work request. If the worker thread determines that the external component API has been avoided the predefined number of times, yes output of step 824, then the worker thread calls the external component API even though the external component API is marked as non-callable in the API state map (step 828).

Afterward, the worker thread makes a determination as to whether calling the external component API was successful (step 830). If the worker thread determines that calling the external component API was unsuccessful, no output of step 830, then the process returns to step 826 where the worker thread notifies the client application that the external component API is non-callable and returns to the pool of worker threads. If the worker thread determines that calling the external component API was successful, yes output of step 830, then the worker thread updates the API state map to indicate that the external component API is in a callable state (step 832). Thereafter, the process returns to step 814 where the worker thread removes a corresponding entry from the worker thread state map after calling the external component API was completed.

Thus, illustrative embodiments of the present invention provide a computer-implemented method, computer system, and computer program product for detecting hang of worker threads in a multi-threaded application process caused by non-callable external component application programming interfaces and performing remediation of detected worker threads in a hang or unresponsive state. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for detecting non-callable external component application programming interfaces, the computer-implemented method comprising:

determining, by a monitoring thread of a computer, whether a first function call stack of a worker thread in a multi-threaded application of the computer matches a second function call stack of the worker thread;

responsive to the monitoring thread determining that the first function call stack matches the second function call stack of the worker thread, identifying, by the monitoring thread, an external component application programming interface (API) corresponding to the worker thread from a function call stack of the worker thread;

marking, by the monitoring thread, the external component API corresponding to the worker thread as non-callable in an API state map;

marking, by the monitoring thread, the worker thread as being in a hang state;

terminating, by the monitoring thread, the worker thread in the hang state as a remediation action step to maintain performance of the computer;

determining, by the monitoring thread, whether the worker thread exceeded a transaction time out limit of a client application;

responsive to the monitoring thread determining that the worker thread did exceed the transaction time out limit of the client application, determining, by the monitoring thread, whether a worker thread state map indicates the external component API corresponding to the worker thread;

responsive to the monitoring thread determining that the worker thread state map is silent regarding the external component API corresponding to the worker thread, taking, by the monitoring thread, the first function call stack of the worker thread at a first time and taking, by the monitoring thread, the second function call stack of the worker thread at a second time; and performing, by the monitoring thread, a comparison of text of the first function call stack to text of the second function call stack of the worker thread.

2. The computer-implemented method of claim 1 further comprising:

responsive to the monitoring thread determining that the worker thread state map does indicate the external component API corresponding to the worker thread, determining, by the monitoring thread, whether a number of worker threads of the multi-threaded application waiting on the external component API is greater than a defined threshold number; and responsive to the monitoring thread determining that the number of worker threads waiting on the external component API is greater than the defined threshold number, marking, by the monitoring thread, the external component API as non-callable in an API state map to prevent other worker threads from invoking a non-callable external component API avoiding worker thread hang.

3. A computer-implemented method for detecting non-callable external component application programming interfaces, the computer-implemented method comprising:

determining, by a monitoring thread of a computer, whether a first function call stack of a worker thread in a multi-threaded application of the computer matches a second function call stack of the worker thread;

responsive to the monitoring thread determining that the first function call stack matches the second function call stack of the worker thread, identifying, by the monitoring thread, an external component application programming interface (API) corresponding to the worker thread from a function call stack of the worker thread;

marking, by the monitoring thread, the external component API corresponding to the worker thread as non-callable in an API state map;

marking, by the monitoring thread, the worker thread as being in a hang state;

terminating, by the monitoring thread, the worker thread in the hang state as a remediation action step to maintain performance of the computer;

reading, by the monitoring thread, a configuration properties file of the multi-threaded application to identify a specified set of external component APIs to monitor and maximum execution time limits corresponding to the specified set of external component APIs;

generating, by the monitoring thread, a worker thread state map that records execution start times of worker threads and corresponding external component APIs with maximum execution time limits; and performing, by the monitoring thread, an analysis of the worker thread state map at predefined time intervals.

4. The computer-implemented method of claim 3 further comprising:

determining, by the monitoring thread, whether the worker thread exceeded a maximum execution time limit of the external component API corresponding to the worker thread based on the analysis of the worker thread state map; and responsive to the monitoring thread determining that the worker thread did exceed the maximum execution time limit of the external component API corresponding to the worker thread based on the analysis of the worker thread state map, sending, by the monitoring thread, an error message indicating the worker thread exceeded the maximum execution time limit of the external component API to a client application that sent a work request corresponding to the worker thread.

5. A computer-implemented method for detecting non-callable external component application programming interfaces, the computer-implemented method comprising:

determining, by a monitoring thread of a computer, whether a first function call stack of a worker thread in a multi-threaded application of the computer matches a second function call stack of the worker thread;

responsive to the monitoring thread determining that the first function call stack matches the second function call stack of the worker thread, identifying, by the monitoring thread, an external component application programming interface (API) corresponding to the worker thread from a function call stack of the worker thread;

marking, by the monitoring thread, the external component API corresponding to the worker thread as non-callable in an API state map;

marking, by the monitoring thread, the worker thread as being in a hang state;

terminating, by the monitoring thread, the worker thread in the hang state as a remediation action step to maintain performance of the computer;

determining, by the worker thread, that the external component API corresponding to a client work request is specified to be monitored in a configuration properties file of the multi-threaded application;

updating, by the worker thread, a worker thread state map with an entry that includes an identifier, an execution start time, and a maximum execution time limit for the external component API;

invoking, by the worker thread, the external component API to execute the client work request;

determining, by the worker thread, whether execution of the external component API exceeded the maximum execution time limit based on the execution start time; and responsive to the worker thread determining that the execution of the external component API did not exceed the maximum execution time limit based on the execution start time, removing, by the worker thread, the entry that includes the identifier, the execution start time, and the maximum execution time limit for the external component API from the worker thread state map.

6. The computer-implemented method of claim 5 further comprising:

sending, by the worker thread, a work request response corresponding to the client work request to a client application via a network; and marking, by the worker thread, the client work request as completed.

7. The computer-implemented method of claim 5 further comprising:

determining, by the worker thread, whether the external component API has been skipped a predefined number of times based on the external component API corresponding to the worker thread being marked as non-callable in the API state map;

responsive to the worker thread determining that the external component API has been skipped previously the predefined number of times, invoking, by the worker thread, the external component API to execute the client work request;

determining, by the worker thread, whether invocation of the external component API was successful; and responsive to the worker thread determining that the invocation of the external component API was successful, updating, by the worker thread, the external component API as callable in the API state map.

8. A computer system for detecting non-callable external component application programming interfaces, the computer system comprising:

a bus system;

a storage device connected to the bus system, wherein the storage device stores program instructions; and a processor connected to the bus system, wherein the processor executes the program instructions to:

determine, by a monitoring thread of the computer system, whether a first function call stack of a worker thread in a multi-threaded application of the computer system matches a second function call stack of the worker thread;

identify, by the monitoring thread, an external component application programming interface (API) corresponding to the worker thread from a function call stack of the worker thread in response to the monitoring thread determining that the first function call stack matches the second function call stack of the worker thread;

mark, by the monitoring thread, the external component API corresponding to the worker thread as non-callable in an API state map;

mark, by the monitoring thread, the worker thread as being in a hang state; and terminate, by the monitoring thread, the worker thread in the hang state as a remediation action step to maintain performance of the computer system, wherein the processor further executes the program instructions to:

determine, by the monitoring thread, whether the worker thread exceeded a transaction time out limit of a client application;

determine, by the monitoring thread, whether a worker thread state map indicates the external component API corresponding to the worker thread in response to the monitoring thread determining that the worker thread did exceed the transaction time out limit of the client application;

take, by the monitoring thread, the first function call stack of the worker thread at a first time and take, by the monitoring thread, the second function call stack of the worker thread at a second time in response to the monitoring thread determining that the worker thread state map is silent regarding the external component API corresponding to the worker thread; and perform, by the monitoring thread, a comparison of text of the first function call stack to text of the second function call stack of the worker thread.

9. The computer system of claim 8, wherein the processor further executes the program instructions to:

determine, by the monitoring thread, whether a number of worker threads of the multi-threaded application waiting on the external component API is greater than a defined threshold number in response to the monitoring thread determining that the worker thread state map does indicate the external component API corresponding to the worker thread; and mark, by the monitoring thread, the external component API as non-callable in an API state map to prevent other worker threads from invoking a non-callable external component API avoiding worker thread hang in response to the monitoring thread determining that the number of worker threads waiting on the external component API is greater than the defined threshold number.

10. A computer system for detecting non-callable external component application programming interfaces, the computer system comprising:

a bus system;

a storage device connected to the bus system, wherein the storage device stores program instructions; and a processor connected to the bus system, wherein the processor executes the program instructions to:

determine, by a monitoring thread of the computer system, whether a first function call stack of a worker thread in a multi-threaded application of the computer system matches a second function call stack of the worker thread;

identify, by the monitoring thread, an external component application programming interface (API) corresponding to the worker thread from a function call stack of the worker thread in response to the monitoring thread determining that the first function call stack matches the second function call stack of the worker thread;

mark, by the monitoring thread, the external component API corresponding to the worker thread as non-callable in an API state map;

mark, by the monitoring thread, the worker thread as being in a hang state; and terminate, by the monitoring thread, the worker thread in the hang state as a remediation action step to maintain performance of the computer system, wherein the processor further executes the program instructions to:

read, by the monitoring thread, a configuration properties file of the multi-threaded application to identify a specified set of external component APIs to monitor and maximum execution time limits corresponding to the specified set of external component APIs;

generate, by the monitoring thread, a worker thread state map that records execution start times of worker threads and corresponding external component APIs with maximum execution time limits; and perform, by the monitoring thread, an analysis of the worker thread state map at predefined time intervals.

11. A computer program product for detecting non-callable external component application programming interfaces, the computer program product comprising a computer-readable storage medium having program instructions embodied therewith, the program instructions executable by a computer to cause the computer to:

determining, by a monitoring thread of the computer, whether a first function call stack of a worker thread in a multi-threaded application of the computer matches a second function call stack of the worker thread;

responsive to the monitoring thread determining that the first function call stack matches the second function call stack of the worker thread, identifying, by the monitoring thread, an external component application programming interface (API) corresponding to the worker thread from a function call stack of the worker thread;

marking, by the monitoring thread, the external component API corresponding to the worker thread as non-callable in an API state map;

marking, by the monitoring thread, the worker thread as being in a hang state;

terminating, by the monitoring thread, the worker thread in the hang state as a remediation action step to maintain performance of the computer;

determining, by the monitoring thread, whether the worker thread exceeded a transaction time out limit of a client application;

responsive to the monitoring thread determining that the worker thread did exceed the transaction time out limit of the client application, determining, by the monitoring thread, whether a worker thread state map indicates the external component API corresponding to the worker thread;

responsive to the monitoring thread determining that the worker thread state map is silent regarding the external component API corresponding to the worker thread, taking, by the monitoring thread, the first function call stack of the worker thread at a first time and taking, by the monitoring thread, the second function call stack of the worker thread at a second time; and performing, by the monitoring thread, a comparison of text of the first function call stack to text of the second function call stack of the worker thread.

12. The computer program product of claim 11 further comprising:

responsive to the monitoring thread determining that the worker thread state map does indicate the external component API corresponding to the worker thread, determining, by the monitoring thread, whether a number of worker threads of the multi-threaded application waiting on the external component API is greater than a defined threshold number; and responsive to the monitoring thread determining that the number of worker threads waiting on the external component API is greater than the defined threshold number, marking, by the monitoring thread, the external component API as non-callable in an API state map to prevent other worker threads from invoking a non-callable external component API avoiding worker thread hang.

13. A computer program product for detecting non-callable external component application programming interfaces, the computer program product comprising a computer-readable storage medium having program instructions embodied therewith, the program instructions executable by a computer to cause the computer to:

determining, by a monitoring thread of the computer, whether a first function call stack of a worker thread in a multi-threaded application of the computer matches a second function call stack of the worker thread;

responsive to the monitoring thread determining that the first function call stack matches the second function call stack of the worker thread, identifying, by the monitoring thread, an external component application programming interface (API) corresponding to the worker thread from a function call stack of the worker thread;

marking, by the monitoring thread, the external component API corresponding to the worker thread as non-callable in an API state map;

marking, by the monitoring thread, the worker thread as being in a hang state;

terminating, by the monitoring thread, the worker thread in the hang state as a remediation action step to maintain performance of the computer;

reading, by the monitoring thread, a configuration properties file of the multi-threaded application to identify a specified set of external component APIs to monitor and maximum execution time limits corresponding to the specified set of external component APIs;

generating, by the monitoring thread, a worker thread state map that records execution start times of worker threads and corresponding external component APIs with maximum execution time limits; and performing, by the monitoring thread, an analysis of the worker thread state map at predefined time intervals.

14. The computer program product of claim 13 further comprising:

determining, by the monitoring thread, whether the worker thread exceeded a maximum execution time limit of the external component API corresponding to the worker thread based on the analysis of the worker thread state map; and responsive to the monitoring thread determining that the worker thread did exceed the maximum execution time limit of the external component API corresponding to the worker thread based on the analysis of the worker thread state map, sending, by the monitoring thread, an error message indicating the worker thread exceeded the maximum execution time limit of the external component API to a client application that sent a work request corresponding to the worker thread.

* * * * *